2,166,285

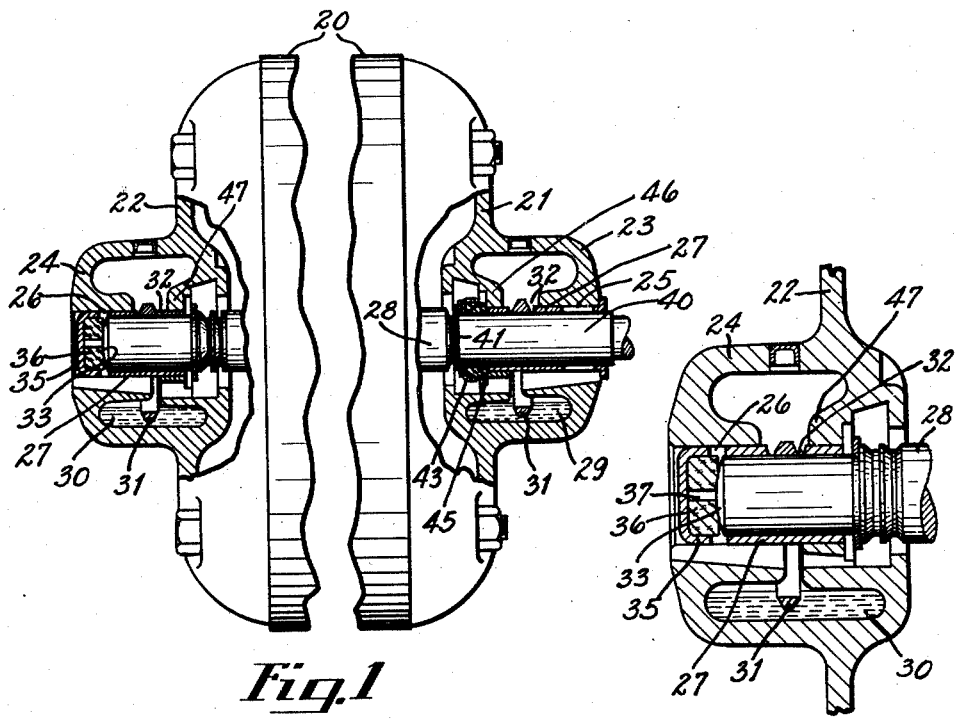
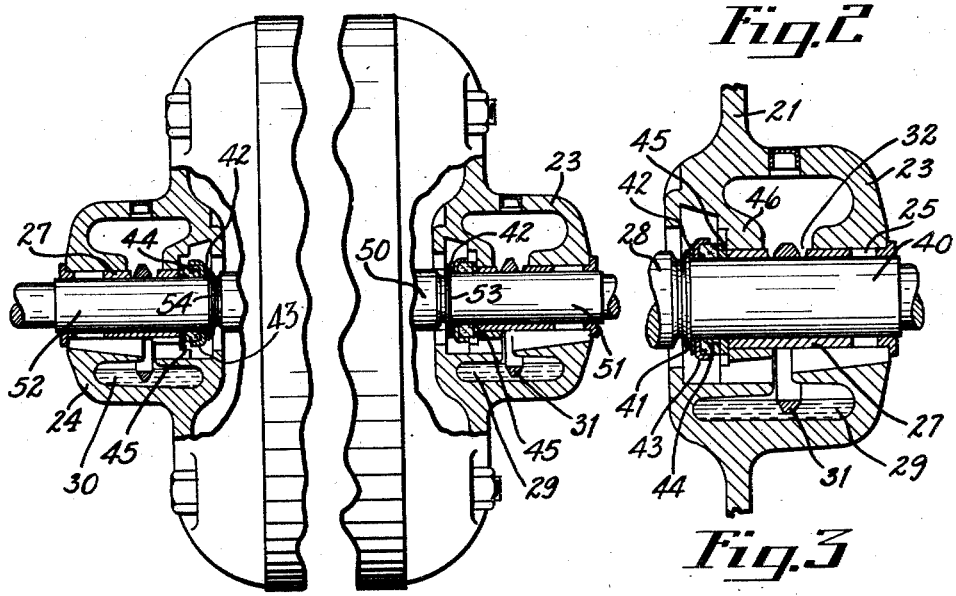
Fig.1  Fig.2  Fig.4  Fig.3
INVENTOR
Bernard A. Brown
BY
Spencer, Hardman & Fehr
his ATTORNEYS Patented July 18, 1939

UNITED STATES PATENT OFFICE 2,166,285

CUSHIONING DEVICE FOR ELECTRIC MOTORS

Bernard A. Brown, Dayton, Ohio, assignor to General Motors Corporation, Detroit, Mich., a corporation of Delaware Application January 19, 1935, Serial No. 2,491

1 Claim. (Cl. 308—163)

This invention relates to electric motors, and more particularly to devices for buffing or cushioning the end play of the motor.

An object of the present invention is to provide a cushioning means which will suppress unwelcome sounds due to end play and which will remain effective for a long period of time. This object is accomplished by providing smooth metallic surfaces which are carried by a shaft, and said surfaces oppose cork or other resilient materials which are mounted in various relations with respect to the shaft, said cork or resilient materials being continually lubricated, when the shaft is rotating, by lubricant preferably from a pocket or well that contains a supply of lubricant that also lubricates the bearings which support the shaft; and said cork or resilient materials being placed in various positions so as to cushion the shaft in either direction of axial movement; and in which the arrangement of the cushioning means are such that after the shaft has been rotated a short period of time, an end surface of each cushioning member will be glazed sufficiently to reduce friction to practically zero.

Further objects and advantages of the present invention will be apparent from the following description, reference being had to the accompanying drawing wherein a preferred embodiment of the present invention is clearly shown.

In the drawing:

Fig. 1 shows an electric motor with parts broken away so as to show a structure embodying the present invention.

Fig. 2 is an enlarged sectional view of a construction shown in Fig. 1.

Fig. 3 is an enlarged sectional view showing another construction shown in Fig. 1.

Fig. 4 shows an electric motor similar to Fig. 1 showing an alternative form of the invention.

Referring to Fig. 1, 20 designates a field frame to which end members 21 and 22 are attached. The end members 21 and 22 respectively, are provided with suitable extensions 23 and 24 which are provided with orifices 25 and 26 to receive bearings 27 for an armature shaft 28. The extensions 23 and 24 respectively, are formed with hollow portions 29 and 30 respectively, to provide lubricant pockets or wells for supplying lubricant to the bearings. The lubricant is carried from the wells 29 and 30 by rings 31. The bearings 27 are provided with cut-away portions or openings 32 to allow the rings to ride upon the shaft 28. The shaft 28 preferably has at one end thereof a spherical end 33.

The orifice 26 of the extension 24 is adapted to receive a plug, said plug comprising a cup-shaped member 35 and a cork disc 36, or other suitable material. The disc 36 is provided with an aperture 37 that is substantially in alignment with the axis of the shaft 28. The aperture 37 is preferably filled before assembly with grease or other suitable lubricant.

The end of the armature shaft supported by the bearing 27 within the extension 23 is provided with a reduced portion 40, see Fig. 3. The reduced portion is provided with a shoulder 41 on the armature shaft. The reduced portion 40 is adapted to receive loosely a metal shim 42 and a cup-shaped member 43. A cork ring 44 is press fitted on the reduced portion 40. As the ring 44 is forced on the shaft, the cup-shaped member 43 and the shim 42 are urged toward the shoulder 41 until the shim 42 is firmly held against the shoulder 41. As the ring is being press fitted on the shaft, the ring is received by the cup-shaped member 43. This operation will cause the cork ring to drive the member 43 when the shaft 28 is rotated.

The reduced portion 40 also supports loosely an oil thrower 45 which is located between the exposed flat surface of the cork ring 44 and a shoulder 46 provided by the extension 23. A similar shoulder 47 is provided by the extension 24. If the shaft 28 tends to move to the right, as viewed in Figs. 1, 3 and 4, the initial axial movement of the shaft 28 will cause the oil thrower 45 to abut the shoulder 46. When this occurs the cork ring 44 will then quietly arrest and cushion the axial movement of the shaft toward the right. If the shaft 28 tends to move axially toward the left the cushioning of the shaft will be accomplished through the cork disc 36 shown in Figs. 1 and 2, while in the modified form shown in Fig. 4 the cork ring 44 carried on the reduced portion 52 of the shaft 50 will cushion the shaft 50 when it is moved to the left.

When the plug comprising the cup-shaped member 35 and the cork disc 36 is assembled into the orifice 26 so that the cork disc 36 will bear against the spherical end surface 33, the pressure is adjusted to a predetermined value. For example, in the original adjustment of the plug on a certain size of motor, the plug is press fitted into the opening 26 such that the maximum power loss due to friction is substantially 5 watts. After the motor has run for a short period of time, the oil thrower 45 will provide the flat surface of the cork ring 44 with sufficient lubricant, and since the disc 36 is initially lubricated by a supply of grease or lubricant contained in the aperture 37, the oil thrower 45 and the spherical end 33 of the shaft 28 will wear a glazed complementary surface on their adjacent cork surfaces to reduce the friction loss to practically zero. After the glazed surface has been once formed on the cork disc 36 and the cork ring 44, this bearing surface does not wear away appreciably, as both of the cork members are lubricated continuously while the shaft 28 is rotated. If the cork members 36 and 44 should wear after a long period of time, the cup-shaped member may be pressed further into the opening 26 to compensate for the wear of the cork members 36 and 44.

In Fig. 4, a motor similar to that of Fig. 1 is disclosed except that an armature shaft 50 is shown having reduced portions 51 and 52 to provide shoulders 53 and 54 respectively on the shaft 50. These reduced portions are each adapted to receive the elements including the shim 42, the cup-shaped member 43, the cork ring 44 and the oil thrower 45. The method of assembly of these elements on each of the reduced portions 51 and 52 is substantially the same as that disclosed for assemblying the elements on the reduced portion 40 of the shaft 28.

While the embodiment of the present invention as herein disclosed, constitutes a preferred form, it is to be understood that other forms might be adopted, all coming within the scope of the claim which follows.

What is claimed is as follows:

In an electric motor having a rotary armature and frame members providing bearings for the armature, combination of means for cushioning axial movement of the armature shaft along the bearings comprising in combination, a reduced portion on each end of the armature shaft fitting the bearings and providing a shoulder adjacent the armature, a shim disposed on each reduced portion of the shaft and resting against the shoulder, a cup member enclosing a cork member disposed about the reduced shaft portion and press fitted thereon so that the bottom of the cup will engage the shim, and an oil thrower encircling the shaft and interposed between the cork member and the end of the respective bearing member, whereby all axial motion of the shaft is restrained by reason of the cork member.

BERNARD A. BROWN.